(12) United States Patent
Mitlin et al.

(10) Patent No.: US 10,170,251 B2
(45) Date of Patent: Jan. 1, 2019

(54) CARBON NANOSHEETS

(71) Applicant: The Governors of the University of Alberta, Edmonton (CA)

(72) Inventors: David Mitlin, Hannawa Falls, NY (US); Huanlei Wang, Edmonton (CA); Zhanwei Xu, Edmonton (CA); Zhi Li, Edmonton (CA); Chris Holt, Edmonton (CA)

(73) Assignee: The Governors of the University of Alberta, Alberta (CA)

( * ) Notice: Subject to any disclaimer, the term of this patent is extended or adjusted under 35 U.S.C. 154(b) by 49 days.

(21) Appl. No.: 15/271,926

(22) Filed: Sep. 21, 2016

(65) Prior Publication Data
US 2017/0088428 A1 Mar. 30, 2017

Related U.S. Application Data

(63) Continuation of application No. 14/270,291, filed on May 5, 2014, now Pat. No. 9,478,365.
(Continued)

(51) Int. Cl.
*C01B 32/15* (2017.01)
*C01B 32/22* (2017.01)
(Continued)

(52) U.S. Cl.
CPC ............. *H01G 11/86* (2013.01); *C01B 32/05* (2017.08); *C01B 32/184* (2017.08); *C01B 32/19* (2017.08);
(Continued)

(58) Field of Classification Search
CPC ..... C01B 31/02; C01B 2204/04; C01B 32/15; C01B 32/20; C01B 32/30; C01B 32/312;
(Continued)

(56) References Cited

U.S. PATENT DOCUMENTS 4,999,149 A  3/1991  Chen
6,205,016 B1  3/2001  Niu
(Continued)

FOREIGN PATENT DOCUMENTS

CN    102583333 A  *  7/2012  ............. B82Y 40/00

OTHER PUBLICATIONS

Largeot, C., et al., "Relation Between the Ion Size and Pore Size for an Electric Double-Layer Capacitor," Journal of the American Chemical Society 130(9):2730-2731, Mar. 2008.
(Continued)

*Primary Examiner* — Tri V Nguyen
(74) *Attorney, Agent, or Firm* — Murtha Cullina LLP

(57) ABSTRACT

A combined hydrothermal and activation process that uses hemp bast fiber as the precursor to achieve graphene-like carbon nanosheets, a carbon nanosheet including carbonized crystalline cellulose, a carbon nanosheet formed by carbonizing crystalline cellulose, a capacitative structure includes interconnected carbon nanosheets of carbonized crystalline cellulose, a method of forming a nanosheet including carbonizing crystalline cellulose to create carbonized crystalline cellulose. The interconnected two-dimensional carbon nanosheets also contain very high levels of mesoporosity.

18 Claims, 10 Drawing Sheets

Related U.S. Application Data

(60) Provisional application No. 61/819,393, filed on May 3, 2013.

(51) Int. Cl.

| | |
|---|---|
| C01B 32/318 | (2017.01) |
| H01G 11/86 | (2013.01) |
| H01G 11/36 | (2013.01) |
| H01G 11/44 | (2013.01) |
| C01B 32/05 | (2017.01) |
| C01B 32/184 | (2017.01) |
| C01B 32/19 | (2017.01) |
| C01B 32/30 | (2017.01) |
| C01B 32/342 | (2017.01) |
| H01G 11/34 | (2013.01) |
| B82Y 30/00 | (2011.01) |
| B82Y 40/00 | (2011.01) |

(52) U.S. Cl.
CPC ............ *C01B 32/30* (2017.08); *C01B 32/342* (2017.08); *H01G 11/36* (2013.01); *H01G 11/44* (2013.01); *B82Y 30/00* (2013.01); *B82Y 40/00* (2013.01); *C01B 2204/04* (2013.01); *C01P 2004/20* (2013.01); *C01P 2004/24* (2013.01); *C01P 2006/12* (2013.01); *C01P 2006/40* (2013.01); *H01G 11/34* (2013.01); *Y02E 60/13* (2013.01); *Y10S 977/734* (2013.01); *Y10S 977/842* (2013.01); *Y10S 977/948* (2013.01)

(58) Field of Classification Search
CPC ......... C01B 32/05; C01B 32/19; B82Y 30/00; B82Y 40/00
USPC .................. 977/742, 842; 423/448, 460, 461
See application file for complete search history.

(56) References Cited

U.S. PATENT DOCUMENTS

| | | | |
|---|---|---|---|
| 6,522,522 B2 | 2/2003 | Yu et al. | |
| 6,665,169 B2 | 12/2003 | Tennent et al. | |
| 6,882,517 B2 | 4/2005 | Tano et al. | |
| 7,061,749 B2 | 6/2006 | Liu et al. | |
| 7,147,966 B2 | 12/2006 | Ren et al. | |
| 7,442,284 B2 | 10/2008 | Ren et al. | |
| 7,794,840 B2 | 9/2010 | Grigorian et al. | |
| 7,813,108 B2 | 10/2010 | Liu et al. | |
| 7,875,219 B2 | 1/2011 | Zhamu et al. | |
| 7,943,238 B2 | 5/2011 | Grigorian et al. | |
| 7,948,739 B2 | 5/2011 | Zhamu et al. | |
| 8,488,300 B2 | 7/2013 | Meng et al. | |
| 8,497,225 B2 | 7/2013 | Zhamu et al. | |
| 8,599,533 B2 | 12/2013 | Haight et al. | |
| 2004/0051200 A1 | 3/2004 | Struszczyk et al. | |
| 2006/0216222 A1 | 9/2006 | Jang | |
| 2011/0256401 A1 | 10/2011 | Goodell et al. | |
| 2013/0044405 A1 | 2/2013 | Brambilla et al. | |
| 2013/0207033 A1* | 8/2013 | Kim .................... | B01J 20/3028 252/184 |

OTHER PUBLICATIONS

Arbizzani, C., et al., "Safe, High-Energy Supercapacitors Based on Solvent-Free Ionic Liquid Electrolytes," Journal of Power Sources 185(2):1575-1579, Sep. 19, 2008.

Huang, Z.-D., et al., "Self-Assembled Reduced Graphene Oxide/Carbon Nanotube Thin Films as Electrodes for Supercapacitors," Journal of Materials Chemistry 22(8):3591-3599, Feb. 2012.

Gamby, J., et al., "Studies and Characterisations of Various Activated Carbons Used for Carbon/Carbon Supercapacitors," Journal of Power Sources 101 (1):109-116, Oct. 2001.

Subramanian, V., et al., "Supercapacitors From Activated Carbon Derived From Banana Fibers," Journal of Physical Chemistry C 111 (20):7527-7531, May 2007.

Yang, R., et al., "Surface Texture, Chemistry and Adsorption Properties of Acid Blue 9 of Hemp (*Cannabis sativa* L.) Bast-Based Activated Carbon Fibers Prepared by Phosphoric Acid Activation," Biomass and Bioenergy 35(1):437-445, Jan. 2011.

Fan, Z., et al., "Template-Directed Synthesis of Pillared-Porous Carbon Nanosheet Architectures: High-Performance Electrode Materials for Supercapacitors," Advanced Energy Materials 2(4):419-424, Apr. 2012.

Cho, Y.-D., et al., "The Effect of Carbon Coating Thickness on the Capacity of LiFeP04/C Composite Cathodes," Journal of Power Sources 189(1):256-262, Apr. 2009.

Chen, Z., et al., "Three-Dimensional Flexible and Conductive Interconnected Graphene Networks Grown by Chemical Vapour Deposition," Nature Materials 10(6):424-428, Jun. 2011.

Gogotsi, Y., and P. Simon, "True Performance Metrics in Electrochemical Energy Storage," Science 334(6058):917-918, Nov. 2011.

Burke, A., "Ultracapacitors: Why, How, and Where is the Technology," Journal of Power Sources 91(1):37-50, Nov. 2000.

Yoo, J.J., et al., "Ultrathin Planar Graphene Supercapacitors," Nano Letters 11 (4):1423-1427, Apr. 2011.

Wang, D.-W., et al., "3D Aperiodic Hierarchical Porous Graphitic Carbon Material for High-Rate Electrochemical Capacitive Energy Storage," Angewandte Chemie 47(2):373-376, Dec. 2008.

Huang, J., et al., "A Universal Model for Nanoporous Carbon Supercapacitors Applicable to Diverse Pore Regimes, Carbon Materials, and Electrolytes," Chemistry, A European Journal 14(22):6614-6626, Jul. 2008.

Kang, Y.J., et al., "All-Solid-State Flexible Supercapacitors Based on Papers Coated With Carbon Nanotubes and Ionic-Liquid-Based Gel Electrolytes," Nanotechnology 23(6):065401, Feb. 2012.

Kang, Y.J., et al., "All-Solid-State Flexible Supercapacitors Fabricated With Bacterial Nanocellulose Papers, Carbon Nanotubes, and Triblock-Copolymer Ion Gels," ACS Nano 6(7):6400-6406, Jul. 2012.

Chmiola, J., et al., "Anomalous Increase in Carbon Capacitance at Pore Sizes Less Than 1 Nanometer," Science 313(5794):1760-1763, Sep. 2006.

Stoller, M.D., and R.S. Ruoff, "Best Practice Methods for Determining an Electrode Material's Performance for Ultracapacitors," Energy & Environmental Science 3: 1294-1301, Sep. 2010.

Yang, X., et al., "Bioinspired Effective Prevention of Restacking in Multilayered Graphene Films: Towards the Next Generation of High-Performance Supercapacitors," Advanced Materials 23(25):2833-2838, Jul. 2011.

Cheng, F., et al., "Biomass Waste-Derived Microporous Carbons With Controlled Texture and Enhanced Hydrogen Uptake," Chemical Materials 20(5):1889-1895, Mar. 2008.

Lin, R., et al., "Capacitive Energy Storage From −50 to 100° C. Using an Ionic Liquid Electrolyte," Journal of Physical Chemistry Letters 2(11 ):2396-2401, Nov. 2011.

Zhou, J. et al., "Capacitive Performance of Mesoporous Carbons Derived From the Citrates in Ionic Liquid," Carbon 48(10):2765-2772, Aug. 2010.

Frackowiak, E., and F. Béguin, "Carbon Materials for the Electrochemical Storage of Energy in Capacitors," Carbon 39(6):937-950, May 2001.

Zhu, Y. et al., "Carbon-Based Supercapacitors Produced by Activation of Graphene," Science 332(6037):1537-1541, Jun. 2011.

Li, Z. et al., "Carbonized Chicken Eggshell Membranes With 3D Architectures as High-Performance Electrode Materials for Supercapacitors," Advanced Energy Materials 2(4):431-437, Apr. 2012.

Rhim et al. ("Changes in electrical and microstructural properties of microcrystalline cellulose as function of carbonization temperature." Carbon, 48, pp. 1012-1024, online Nov. 13, 2009).

Knight, D.S., and W.B. White, "Characterization of Diamond Films by Raman Spectroscopy," Journal of Materials Research 4(2):385-393, Mar. 1989.

Van Den Broeck, H.C., et al., "Differential Expression of Genes Involved in C-1 Metabolism and Lignin Biosynthesis in Wooden

(56) References Cited

OTHER PUBLICATIONS

Core and Bast Tissues of Fibre Hemp (*Cannabis sativa* L.)," Plant Science 174(2):205-220, Feb. 2008.
Wei, L., and G. Yushin, "Electrical Double Layer Capacitors With Sucrose Derived Carbon Electrodes in Ionic Liquid Electrolytes," Journal of Power Sources 196(8):4072-4079, Apr. 2011.
Vix-Guterl, C., et al., "Electrochemical Energy Storage in Ordered Porous Carbon Materials," Carbon 43(6):1293-1302, May 2005.
Portet, C., et al., "Electrochemical Performance of Carbon Onions, Nanodiamonds, Carbon Black and Multiwalled Nanotubes in Electrical Double Layer Capacitors," Carbon 45(13):2511-2518, Nov. 2007.
Xu, Z., et al., "Electrochemical Supercapacitor Electrodes From Sponge-Like Graphene Nanoarchitectures With Ultrahigh Power Density," Journal of Physical Chemistry Letters 3(20):2928-2933, Oct. 2012.
Conway, B.E., "Electrochemical Supercapacitors: Scientific Fundamentals and Technological Applications," Kluwer Academic/Plenum: New York, 1999, Chap. 1, "Introduction and Historical Perspective," pp. 1-10; Chap. 2, "Similarities and Differences Between Supercapacitors and Batteries for Storing Electrical Energy," pp. 11-18.
Sun, L., et al., "From Coconut Shell to Porous Graphene-Like Nanosheets for High-Power Supercapacitors," Journal of Materials Chemistry A 1 (21):6462-6470, Jun. 2013.
Liu, F., et al., "Graphene-Based Carbon Materials for Electrochemical Energy Storage," Journal of Nanomaterials, vol. 2013, Article ID642915, Jan. 2013, pp. 1-11.
Liu, C., et al., "Graphene-Based Supercapacitor With an Ultrahigh Energy Density," Nano Letters 10(12):4863-4868, Dec. 2010.
Stoller, M.D., "Graphene-Based Ultracapacitors," Nano Letters 8(10):3498-3502, Oct. 2008.
Thygesen, A., et al., "Hemp Fiber Microstructure and Use of Fungal Defibration to Obtain Fibers for Composite Materials," Journal of Natural Fibers 2(4):19-37, 2006.
Rosas, J.M., et al., "Hemp-Derived Activated Carbon Fibers by Chemical Activation With Phosphoric Acid," Fuel 88(1):19-26, Jan. 2009.
Rose, M., et al., "Hierarchical Micro- and Mesoporous Carbide-Derived Carbon as a High-Performance Electrode Material in Supercapacitors," Small 7(8):1108-1117, Mar. 2011.
Sevilla, M., et al., "High Density Hydrogen Storage in Superactivated Carbons From Hydrothermally Carbonized Renewable Organic Materials," Energy & Environmental Science 4:1400-1410, 2011.
Lu, W., et al., "High Performance Electrochemical Capacitors From Aligned Carbon Nanotube Electrodes and Ionic Liquid Electrolytes," Journal of Power Sources 189(2):1270-1277, Apr. 2009.
Fan, M. et al., "High Strength Natural Fiber Composite: Defibrillation and its Mechanisms of Nano Cellulose Hemp Fibers," International Journal of Polymeric Materials 60(13): 1026-1040, 2011.
Balducci, A., et al., "High Temperature Carbon-Carbon Supercapacitor Using Ionic Liquid as Electrolyte," Journal of Power Sources 165(2):922-927, Mar. 2007.
Krause, A., and A. Balducci, "High Voltage Electrochemical Double Layer Capacitor Containing Mixtures of Ionic Liquids and Organic Carbonate as Electrolytes," Electrochemistry Communications 13(8):814-817, Aug. 2011.

Kim, T.Y., et al., "High-Performance Supercapacitors Based on Poly(ionic Liquid)-Modified Graphene Electrodes," ACS Nano 5(1):436-442, Dec. 13, 2010.
Izadi-Najafabadi, A., et al., "High-Power Supercapacitor Electrodes From Single-Walled Carbon Nanohorn/Nanotube Composite," ACS Nano 5(2):811-819, Feb. 2011.
Wei, L., et al., "Hydrothermal Carbonization of Abundant Renewable Natural Organic Chemicals for High-Performance Supercapacitor Electrodes," Advanced Energy Materials 1 (3):356-361, May 2011.
Armand, M., et al., "Ionic-Liquid Materials for the Electrochemical Challenges of the Future," Nature Materials 8(8):621-629, Aug. 2009.
"K2 Series Ultracapacitors," Maxwell Technologies, © 2013, data based on their medium cell with highest power density available, Model BCAP3000 and BCAP3010, <http://www.maxwell.com> [retrieved Nov. 6, 2015], 6 pages.
El-Kady, M.F., et al., "Laser Scribing of High-Performance and Flexible Graphene-Based Electrochemical Capacitors," Science 335(6074):1326-1330, Mar. 2012.
Simon, P., and Y. Gogotsi, "Materials for Electrochemical Capacitors," Nature Materials 7(11):845-854, Nov. 2008.
Wang, D.-W., et al., "Mesopore-Aspect-Ratio Dependence of Ion Transport in Rodtype Ordered Mesoporous Carbon," Journal of Physical Chemistry C 112(26):9950-9955, Jul. 2008.
Xu, B., et al., "Mesoporous Activated Carbon Fiber as Electrode Material for High-Performance Electrochemical Double Layer Capacitors With Ionic Liquid Electrolyte," Journal of Power Sources 195(7):2118-2124, Apr. 2010.
Lazzari, M., et al., "Mesoporous Carbon Design for Ionic Liquid-Based, Double-Layer Supercapacitors," Fuel Cells 10(5):840-847, Oct. 2010.
Kumar, P., et al., "Methods for Pretreatment of Lignocellulosic Biomass for Efficient Hydrolysis and Biofuel Production," Industrial & Engineering Chemistry Research 48(8):3713-3729, Apr. 2009.
Largeot, C., et al., "Microporous Carbon-Based Electrical Double Layer Capacitor Operating at High Temperature in Ionic Liquid Electrolyte," Electrochemical and Solid-State Letters 14(12):A 174-A 176, 2011.
Lu, W., et al., "Nanocomposite Electrodes for High-Performance Supercapacitors," Journal of Physical Chemistry Letters 2(6):655-660, Mar. 2011.
Wei, L, and G. Yushin, "Nanostructured Activated Carbons From Natural Precursors for Electrical Double Layer Capacitors," Nano Energy 1(4):552-565, Jul. 2012.
Pandey, G.P., et al., "Performance Studies of Activated Charcoal Based Electrical Double Layer Capacitors With Ionic Liquid Gel Polymer Electrolytes," Energy Fuels 24(12):6644-6652, Dec. 2010.
Wei, L., et al., "Polypyrrole-Derived Activated Carbons for High-Performance Electrical Double-Layer Capacitors With Ionic Liquid Electrolyte," Advanced Functional Materials 22(4):827-834, Feb. 2012.
Rosas, J.M., et al., "Preparation of Hemp-Derived Activated Carbon Monoliths. Adsorption of Water Vapor," Industrial & Engineering Chemistry Research 47(4):1288-1296, Feb. 2008.

* cited by examiner

CARBON NANOSHEETS

CROSS-REFERENCE TO RELATED APPLICATIONS

This application is a continuation of pending U.S. patent application Ser. No. 14/270,291, filed May 5, 2014, which claims the benefit under 35 U.S.C. § 119(e) of U.S. Provisional Application No. 61/819,393, filed May 3, 2013. The content of all prior applications is incorporated herein by reference.

TECHNICAL FIELD

Carbon nanosheets.

BACKGROUND

Electrochemical capacitors (known as ultracapacitors or supercapacitors) based on electrical double layer (EDL) charge accumulation hold promise for a wide range of applications, including portable electronics, uninterruptible power sources, medical devices, load leveling, and hybrid electric vehicles. Conventional organic electrolytes used in EDL supercapacitors contain a mixture of a solvent and a salt. However, the exclusive use of organic electrolytes may limit the broadening of the supercapacitors' commercial application base, since solvents such as acetonitrile have issues associated with their flammability at elevated temperatures, as well as their toxicity and environmental impact. Alternative electrolytes based on solvent-free ionic liquids possess several advantages over organic ones, including higher operating voltage windows (>3V vs. ~2V), lower toxicity, negligible vapor pressure, and much better thermal stability. Unfortunately, supercapacitors based on ionic liquids normally perform well only at temperatures near or above 60° C. The room temperature performance, which is an essential prerequisite for most commercial applications, remains poor due to ionic liquid's high viscosity and low ionic diffusivity. Moreover, large cation and anion sizes limit the usefulness of conventional microporous activated carbon electrodes since the ions either literally do not fit into pores or become diffusion limited at required scan rates. It is only with custom tailored eutectic ionic liquids that lower temperature performance may be achieved using carbon nanotubes and carbon onions.

Activated carbons, templated carbons, carbon nanofibers, carbon nanotubes, carbide-derived carbons, and graphene have been intensively investigated for supercapacitor electrode applications. Among them, activated carbons have been successfully developed as electrodes for commercial supercapacitor devices. Commercial high surface area "electrode grade" activated carbons usually possess moderate gravimetric capacitances in the range of 100-120 F $g^{-1}$ in an organic electrolyte. Depending on the commercial source, activated carbons are derived from pyrolysis of agricultural wastes or from the coking operation during petroleum refining. Recently, outstanding specific capacitances of 200-300 F $g^{-1}$ in organic electrolyte or ionic liquid have been reported by employing improved activated carbon electrodes, with tailored pore size distributions. However the power characteristics of many of these carbons remain limited due to an intrinsically high fraction of microporosity, which in turn limits pore accessibility of the electrolyte ions at high scan rates.

It is becoming well understood that the key to achieving high power in porous electrodes is to reduce the ion transport time. The ion transport time ($\tau$) can be expressed by the equation of $\tau=l^2/d$, where l is the ion transport length and d is the ion transport coefficient. From that vantage, carbons with open 2D type morphology possess an intrinsic advantage over particulate type systems since the ion transport length is significantly shortened in the thin dimension. Therefore nanomaterials based on graphene and their hybrids have emerged as a new class of promising high-rate electrode candidates. Activated graphene, curved graphene, laser-scribed graphene, ultrathin planar graphene and sponge-like graphene, which possess large open and relatively flat adsorption surfaces in addition to high in-plane electrical conductivity, have excellent electrochemical performance with energy-power combinations often much superior to activated carbons. Widely used methods for synthesis of graphene-like materials include modified Hummers method, chemical vapor deposition, and microwave synthesis. Unfortunately, even the most economically produced graphene-like material is nowhere near cost competitive with petroleum or biowaste derived carbons achieved via simple pyrolysis or hydrothermal methods. Biomass, which mainly contains cellulose, hemicelluloses, and lignin biopolymers, is widely utilized as a feedstock for activated carbon production.

Hemp (*Cannabis sativa* L.) has been cultivated for centuries since it grows quickly without any special requirements for climate, pesticides, or fertilizer. Besides the ancient applications for rod, sails, and clothing, hemp is currently being used for paper, building materials, food, medicine, oil, fuel, and in the plastics industry. Conventionally, carbonized hemp fiber has also been recently prepared, with activation being achieved via water, ZnCl2, and H3PO4. Though the products were not fully tested for electrochemical energy storage it is expected that they would perform entirely analogously to other forms of pyrolyzed carbon particulates.

SUMMARY

What would be ideal is to employ a relatively green carbonization method to create nanosheets with graphene-like morphology, rather than activated carbon-like particulates, using such precursors. Here, we report a combined hydrothermal and activation processes that uses hemp bast fiber as the precursor to achieve graphene-like carbon nanosheets. The interconnected two-dimensional carbon nanosheets also contain very high levels of mesoporosity. Such structures are quite unique, and as expected they display remarkable electrochemical properties in a conventional ionic liquid electrolyte.

According to an aspect of the invention, there is provided a carbon nanosheet comprising carbonized crystalline cellulose. In various embodiments, there may be included any one or more of the following features: The carbonized crystalline cellulose comprises activated carbonized crystalline cellulose fibrils. The carbonized crystalline cellulose comprises carbonized exfoliated crystalline cellulose hemp fibrils. The activated carbonized crystalline cellulose comprises activated hydrothermal carbonized crystalline cellulose. The carbon nanosheet is between 10 and 30 nanometers thick. The carbon nanosheet is at least partly graphitized.

According to a further aspect of the invention, there is provided a carbon nanosheet formed by carbonizing crystalline cellulose. In various embodiments, there may be included any one or more of the following features: The crystalline cellulose comprises crystalline cellulose fibrils. The crystalline cellulose comprises exfoliated crystalline cellulose hemp fibrils. Carbonizing comprises a hydrothermal treatment. Carbonizing comprises activating. Activating comprises alkali activating. The carbon nanosheet is between 10 and 30 nanometers thick. The carbon nanosheet is at least partly graphitized.

According to a further aspect of the invention, there is provided a capacitative structure comprising interconnected carbon nanosheets of carbonized crystalline cellulose. In various embodiments, there may be included any one or more of the following features: The carbonized crystalline cellulose comprises activated carbonized crystalline cellulose fibrils. The carbonized crystalline cellulose comprises exfoliated carbonized crystalline cellulose hemp fibrils. The carbonized crystalline cellulose comprises activated hydrothermal carbonized crystalline cellulose. The carbon nanosheet is between 10 and 30 nanometers thick. The carbon nanosheet is at least partly graphitized.

A method is also disclosed of forming a nanosheet comprising carbonizing crystalline cellulose to create carbonized crystalline cellulose. In various embodiments, there may be included any one or more of the following features: Carbonizing comprises a partial carbonization step followed by activating the carbonized crystalline cellulose. The crystalline cellulose comprises crystalline cellulose fibrils. The crystalline cellulose comprises crystalline cellulose hemp fibrils and further comprising exfoliating the crystalline cellulose hemp fibrils. Exfoliating and carbonizing comprises a hydrothermal treatment. Activating comprises alkali activating. The carbon nanosheet is between 10 and 30 nanometers thick. The carbon nanosheet is at least partly graphitized.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 7A was evaluated at 0° C., FIG. 7B was evaluated at 20° C., FIG. 7C was evaluated at 60° C., and FIG. 7D was evaluated at 100° C.

DETAILED DESCRIPTION

Immaterial modifications may be made to the embodiments described here without departing from what is covered by the claims.

Figure 1:
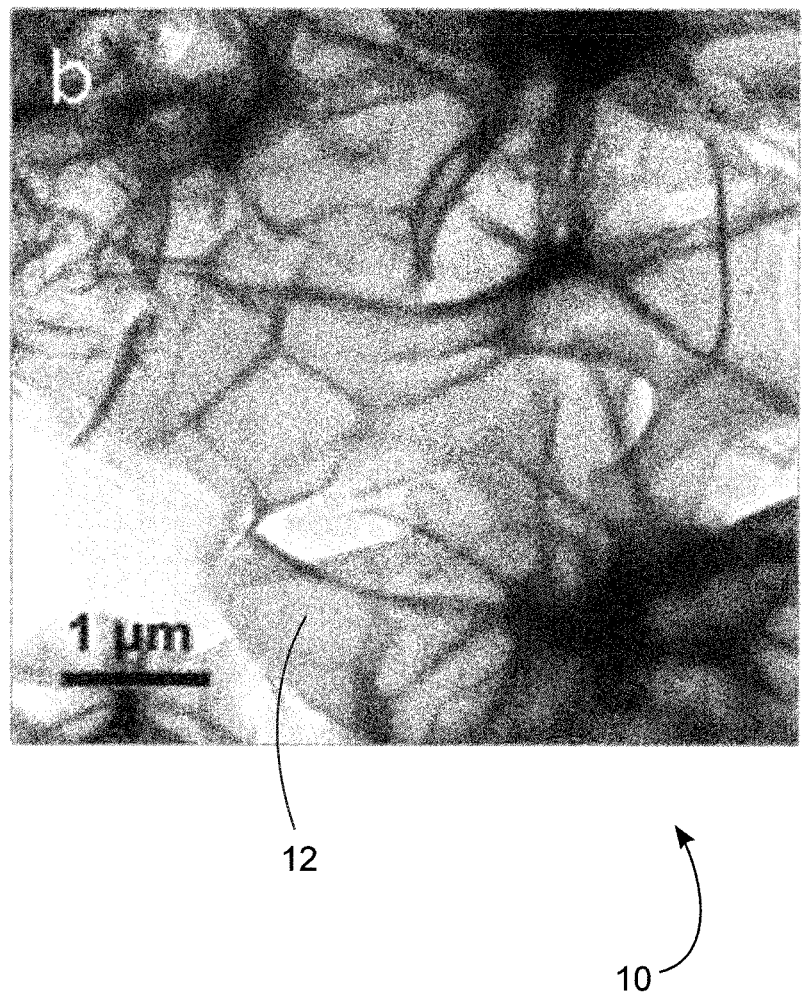
FIG. 1 is a transmission electron microscopy (TEM) micrograph of an exemplary carbon nanosheet.

Referring to FIG. 1, a carbon nanosheet 10 is shown comprising carbonized crystalline cellulose 12. The carbonized crystalline cellulose may comprise activated carbonized crystalline cellulose fibrils. The carbonized crystalline cellulose may comprise carbonized exfoliated crystalline cellulose hemp fibrils. The activated carbonized crystalline cellulose may comprise activated hydrothermal carbonized crystalline cellulose. The carbon nanosheet may be between 10 and 30 nanometers thick. The carbon nanosheet may be at least partly graphitized.

There is also disclosed a carbon nanosheet formed by carbonizing crystalline cellulose. The crystalline cellulose may comprise crystalline cellulose fibrils. The crystalline cellulose may comprise exfoliated crystalline cellulose hemp fibrils. Carbonizing may comprise a hydrothermal treatment. Carbonizing may comprise activating. Activating may comprise alkali activating. The carbon nanosheet may be between 10 and 30 nanometers thick. The carbon nanosheet may be at least partly graphitized.

There is also disclosed a capacitative structure comprised of interconnected carbon nanosheets of carbonized crystalline cellulose. The carbonized crystalline cellulose may comprise activated carbonized crystalline cellulose fibrils. The carbonized crystalline cellulose may comprise exfoliated carbonized crystalline cellulose hemp fibrils. The carbonized crystalline cellulose may comprise activated hydrothermal carbonized crystalline cellulose. The carbon nanosheet may be between 10 and 30 nanometers thick. The carbon nanosheet may be at least partly graphitized.

Figure 2:
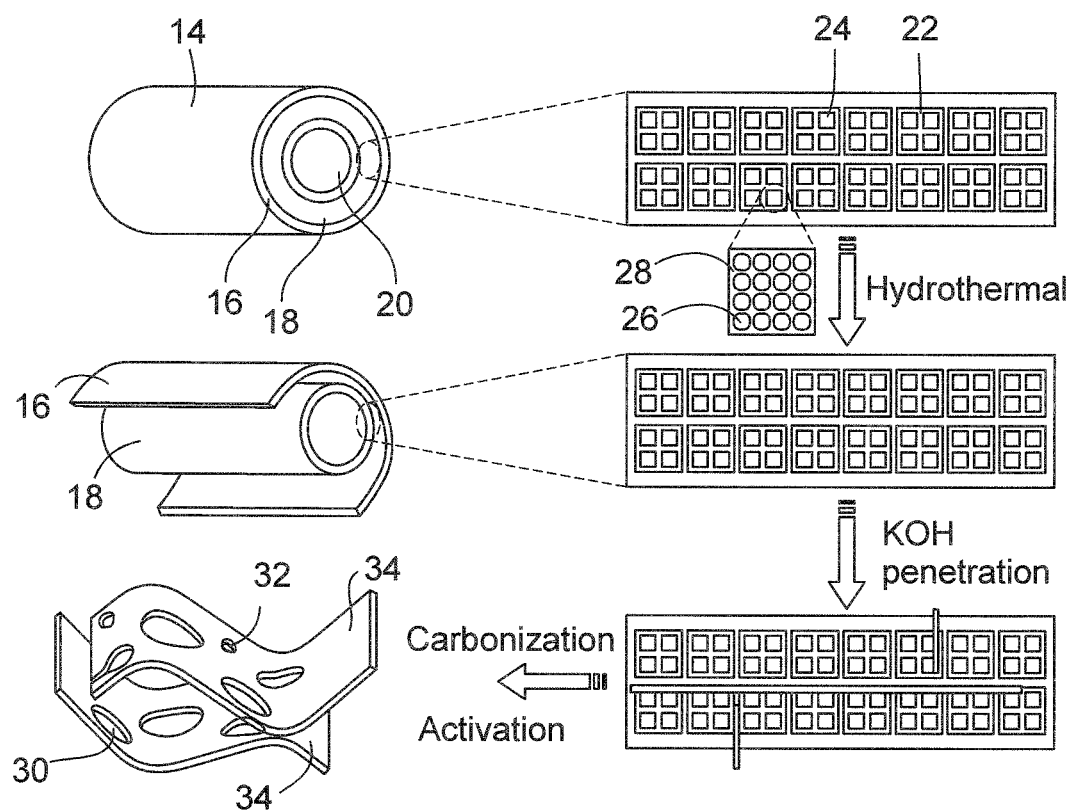
FIG. 2 is a schematic of synthesis process for hemp-derived carbon nanosheets with three different structural layers.

Referring to FIG. 2, there is shown a method of forming a nanosheet comprising carbonizing crystalline cellulose to create carbonized crystalline cellulose. Carbonizing may comprise a partial carbonization step followed by activating the carbonized crystalline cellulose. The crystalline cellulose may comprise crystalline cellulose fibrils. The crystalline cellulose may comprise crystalline cellulose hemp fibrils and further comprising exfoliating the crystalline cellulose hemp fibrils. Exfoliating and carbonizing may comprise a hydrothermal treatment. Activating may comprise alkali activating. The carbon nanosheet may be between 10 and 30 nanometers thick. The carbon nanosheet may be at least partly graphitized.

From the experimental results and the properties of similar organic source materials, it is predicted that other sources of crystalline cellulose can be used other than hemp. To achieve the nano-sheet like materials, the original arrangement of crystalline cellulose, semi-cellulose and lignin in biomass is critical. In this concern, other fiber-rich biomasses with layered structures, such as those bamboo or coconuts shell, are promising and should work as well.

Although a method of carbonizing or partial carbonizing, by hydrothermal treatment is disclosed, other methods may be used. The hydrothermal treatment has two roles: exfoliate the layered structure of hemp fiber and pre-carbonization (not fully carbonized yet). We believe the first role is more important for this stage of the process. The inventors predict that it is possible to first exfoliate the hemp fiber by strong sonication (or other exfoliation techniques) and then carbonize it, which may give thinner sheets. This prediction is based on the success of the disclosed method and the similar technological properties of the predicted methods.

For hydrothermal treatment a catalyst is used to accelerate the decomposition of biomass. A weak solution of sulphuric acid was used in the experimental method. Iron oxide and chloride and other hydrothermal catalysts have similar effects and may be used.

In the preferred embodiment of hydrothermal treatment disclosed, the key step to achieve the nanostructure is the hydrothermal treatment (exfoliation and pre-carbonization). After that, the activation process is just thinning the carbon sheet and generating pores by etching away some portion of carbon. Therefore, lots of traditional activation methods could be used to activate the materials. Besides KOH, NaOH, $ZnCl_2$, and $H_3PO_4$ and other activation agents should also work as activation agents. In addition, the $CO_2$ activation and steam activation widely used in industry to produce activated charcoal may also be used.

The hydrothermal carbonization process caused the hemp bast fiber, which initially resembled a macroscopic yarn, to break up into smaller pieces. The subsequent activation with KOH generated the carbon nanosheets, denoted by CNS-X, where X refers to the activation temperature (in ° C.). Scanning electron microscopy (SEM) analysis of the carbon nanosheet samples CNS-800 shows a highly interconnected 2D sheet-like structure. SEM micrographs of CNS-700 and CNS-750 demonstrate a similar structure in the lower activation temperature specimens. The macroporous voids, as shown in the SEM images, are beneficial since during electrochemical testing they can serve as ion-buffering reservoirs.

FIG. 1 shows a transmission electron microscopy (TEM) micrograph that highlights the structure of CNS-800, which consists of highly interconnected carbon nanosheets. High resolution TEM analysis shows a porous and partially ordered structure of CNS-800. Annual dark field (ADF) TEM micrographs and electron energy loss spectroscopy (EELS) thickness profiles were created of CNS samples CNS-700, CNS-750 and CNS-800. The CNS specimens had a generally similar structure, though with a slightly differing thicknesses. The thickness of the individual carbon nanosheets decreased with the increase of activation temperature, which is in the range of 50-100 nm for CNS-700, 40-70 nm for CNS-750 and 10-30 nm for CNS-800.

Combining the unique structure of the hemp bast fiber with a hydrothermal synthesis treatment is critical to achieve the carbon nanosheet morphology. Hemp bast fiber has a multi-level layered structure composed of cellulose, semi-cellulose and lignin. As schematically illustrated in FIG. 2, the wall of a hollow hemp fiber 14 (10-30 μm in diameter) is mainly composed of three layers. The internal 20 (S3) and outer 16 (S1) layers are mainly composed of semi-cellulose and lignin while the middle layer 18 (S2) is primarily crystalline cellulose (~70 wt %). S2 layer 18, which makes up more than 85% of the total wall thickness, is itself a layered structure consisting of microfibrils 22 that are 10-30 nm in diameter. Moreover, these microfibrils consist of bundles 24 of highly crystalline cellulose elementary fibrils 26 (~2 nm in diameter) surrounded by semi-cellulose 28. Under the relatively aggressive hydrothermal conditions at 180° C., most of semi-cellulose and part of lignin are converted into soluble organic compounds, while the crystalline cellulose is partially carbonized. Hence the S1 and S3 layers are removed while the connections between the 10-30 nm diameter microfibrils in the S2 layer are loosened. In the subsequent activation process at 700-800° C., the KOH melt penetrates into the loose connection between the microfibers, causing full separation of layers 34 as sheets. Meanwhile, the layers are carbonized and activated by the KOH, further reducing their thickness and generating micro and mesoporosity. The layers are shown in FIG. 2 with a simplified distribution of macroporous voids 30 with diameters of 1-2 μm and micro/mesopores 32.

It is worthwhile to point out that what is highlighted in FIG. 2 is a simplified schematic description of the process. The reactions occurring during hydrothermal carbonization of biomass are in fact quite complicated, involving hydrolysis, dehydration, decomposition, and condensation. The hydrothermal process can hydrolyze lignin and hemicellulose, decrease the crystallinity of cellulose, and increase the porosity of the biomass. The high levels of oxygen-containing functional groups in the product of the hydrothermal synthesis process (defined as "biochar"), make it highly reactive for subsequent chemical activation. The carbon, oxygen, and nitrogen content was obtained from X-ray photoelectron spectroscopy (XPS), for the post hydrothermal hemp biochar and the CNS samples. The carbon, oxygen and nitrogen contents were found to be, in atomic percent: Biochar: 73.54 $C_{XPS}$, 1.77 $N_{XPS}$, 24.69 $O_{XPS}$; CNS-700: 93.69 $C_{XPS}$, 0.90 $N_{XPS}$, 5.41 $O_{XPS}$; CNS-750: 93.39$C_{XPS}$, 1.01 $N_{XPS}$, 5.6 $O_{XPS}$; CNS-800: 94.33 $C_{XPS}$, 1.48 $N_{XPS}$, 4.19 $O_{XPS}$; commercial activated carbon (AC): 95.35$C_{XPS}$, 4.65 $O_{XPS}$; commercial grapheme nanoplatelets (CG): 93.97 $C_{XPS}$, 6.03$O_{XPS}$. The biochar has very high oxygen content, and therefore it should be responsive to the KOH treatment. As a comparison, we directly carbonized the hemp followed by KOH activation under the same conditions as CNS. SEM analysis of the traditionally carbonized hemp bast fiber (pre-activation) shows a smooth surface and a dense structure. After activation, no layered structures were observed, further indicating the importance of hydrothermal process.

It is known that KOH activation will generate micro/mesopores inside carbons, with the surface area and porosity being controlled by the activation temperature. Table 1, below, provides details of the textural characteristics of the carbon materials. It can be seen that the surface area firstly increases with activation temperature, going from 1690 $m^2$ $g^{-1}$ for CNS-700 to 2287 $m^2$ $g^{-1}$ for CNS-750, and then decreases to 1505 $m^2$ $g^{-1}$ for CNS-800. Nitrogen adsorption-desorption analysis showed type I/IV isotherms could be found for all samples. However, the broadening of the knee in the relatively low-pressure range for CNS-750 and CNS-800 suggests small mesopores developing at increased activation temperatures. The amount of mesopores progressively increases with activation temperature. Pore size distribution was calculated from the adsorption isotherms using density functional theory (DFT) method and indicates that CNS-750 has the highest pore volume between 2 and 3 nm. On the other hand, mesopores larger than 3 nm are well developed for CNS-800 as a result of the widening of pre-existing pores.

TABLE 1

Physical parameters for hemp-derived carbon nanosheets and for baseline commercial activated carbon and commercial graphene nanoplatelets

| Samples | SBET (m2g-1)[a] | SDFT (m2g-1)[b] | Vt (cm3g-1)[c] | Smicro (m2g-1)[d] | Pore volume in cm³ g-1e and (pore volume percentage (%)) | | | Conductivity (Sm-1) | IG/ID (La(nm))[g] |
|---|---|---|---|---|---|---|---|---|---|
| | | | | | V < 1 nm | V1-2 nm | V > 2 nm | | |
| CNS-700 | 1690 | 1340 | 1.08 | 1150 | 0.20(22.5) | 0.33(37.1) | 0.36(40.4) | 217 | 0.89(3.92) |
| CNS-750 | 2287 | 1700 | 1.45 | 1375 | 0.23(19.0) | 0.45(37.2) | 0.53(43.8) | 211 | 0.85(3.74) |
| CNS-800 | 1505 | 1160 | 1.26 | 880 | 0.16(16.3) | 0.25(25.5) | 0.57(58.2) | 226 | 0.93(4.09) |
| AC | 2050 | 1570 | 1.17 | 1323 | 0.23(22.5) | 0.40(39.2) | 0.39(38.3) | ~33f | 0.52(2.29) |
| CG | 726 | 637 | 1.37 | 439 | 0.085(8.5) | 0.095(9.5) | 0.82(82.0) | 294 | 1.55(6.82) |

Raman spectroscopy analysis was employed to further investigate the structure of the CNS specimens. All samples exhibit a broad disorder-induced D-band ($\approx 1330$ cm$^{-1}$) and in-plane vibrational G-band ($\approx 1590$ cm$^{-1}$). In all the carbon nanosheets the intensity of the G band is significantly higher than that of the D band, indicating that the nanosheets are partially graphitized. Moreover the ratio of the integrated intensities ($I_G/I_D$=0.89 (CNS-700), 0.85 (CNS-750), and 0.93 (CNS-800) is significantly higher than for the commercial activated carbon (Norit™, $I_G/I_D$=0.52 (AC)). It is known that KOH activation tends to attack the aligned (i.e., graphitic) structural domains in a carbon matrix, resulting in a highly porous but disordered structure with relatively poor electrical conductivity. However, the KOH activated CNS samples show a relatively high degree of graphitization, which is related to the intrinsic complex hierarchical structure of the hemp precursor. As discussed earlier, hemp bast fiber contains a high content of crystalline cellulose. During the high temperature KOH activation, carbonization leads to structural alignment, while the breakdown of aligned structural domains occurs due to the intercalation of potassium compounds. The ultimate degree of graphitic order in the final product results from a balance of these competing processes. The lowest relative $I_G/I_D$ ratio is at the intermediate activation temperature, supporting the argument regarding the competition between carbonization-induced ordering and activation-induced dissolution. Table 1, above, shows the calculated mean width ($L_a$) of the graphitic domains in each specimen, which is proportional to the $I_G/I_D$ ratio. The higher values of $L_a$ indicates the higher electrical conductivity. The electrical conductivity of CNS samples, measured by the four-point probing method on a pellet compacted at 20 MPa die pressure, is 217, 211, 226 S m$^{-1}$ for CNS-700, CNS-750, and CNS-800 (Table 1, above). These values are much higher than what is reported for commercially available Norit™ activated carbon (33 S m$^{-1}$ was obtained from literature, since AC granules could not be compressed into pellets structurally stable enough for 4 point probe electrical measurements), and are closer to what we obtained for commercial graphene nanoplatelets (Cheap Tubes Inc., labeled as CG, 294 S m$^{-1}$) measured identically. It is known that a partially graphitic carbon structure and a high level of interconnectedness ensures improved electrical conductivity in carbon-based electrodes, which makes the CNS materials ideal for high power applications.

X-ray diffraction (XRD) patterns of the carbon nanosheets CNS-800, CNS-750 and CNS-700 each show a broad peak centered at 2θ=23°, which corresponds to the (002) reflection of graphite. This value yields a basal plane interlayer distance of 0.39-0.40 nm. Based on the well-known Scherer equation, the c-axis length in the graphitic lattice can be estimated to be 1.4-1.5 nm. Therefore, the carbon nanosheets are composed of 3-4 layer-stacked graphene sheets (e.g., 1.5/0.39=3.84) surrounded by regions of disorder.

Figure 3A:
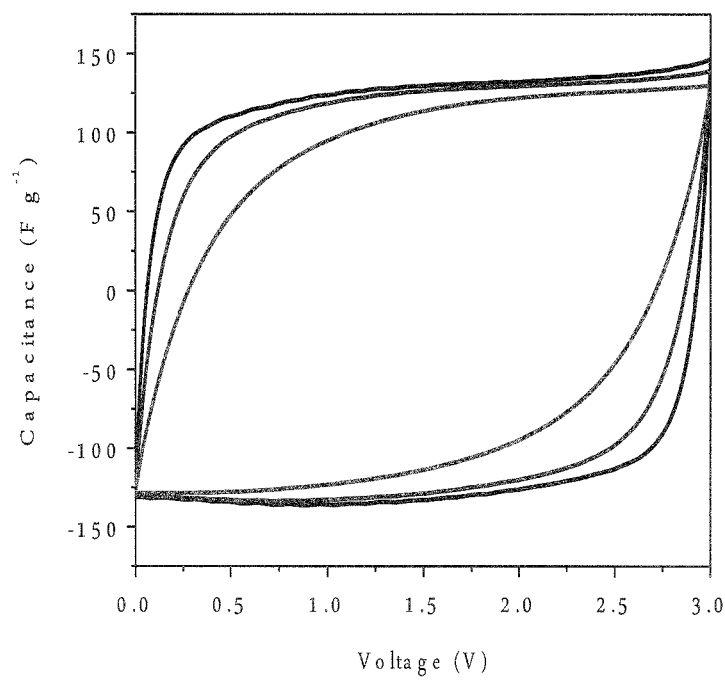
FIG. 3A is a graph showing cyclic voltammetry (CV) curves of CNS-800 for three different scan rates, tested at 20° C. The scan rates are, from the innermost to outermost curve: 0.1 V s$^{-1}$, 0.2 V s$^{-1}$ and 0.6 V s$^{-1}$.
Figure 6A:
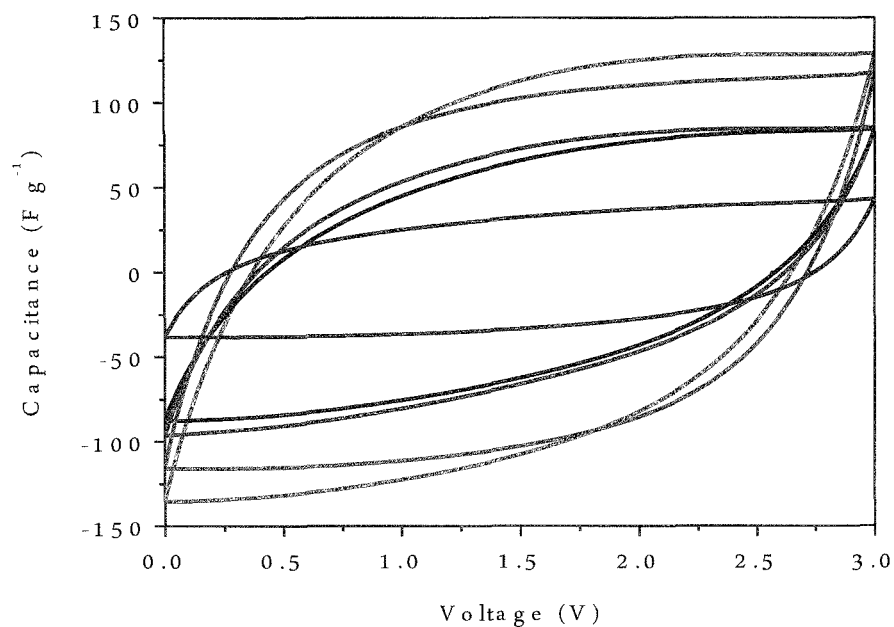
FIG. 6A is a graph showing CV curves of resultant carbon nanosheets, commercial activated carbon and commercial graphene nanoplatelets measured at 20° C. and 500 mV s$^{-1}$. The materials are, from the innermost to outermost curve (vertically): CG, AC, CNS-700, CNS-800 and CNS-750.
Figure 6B:
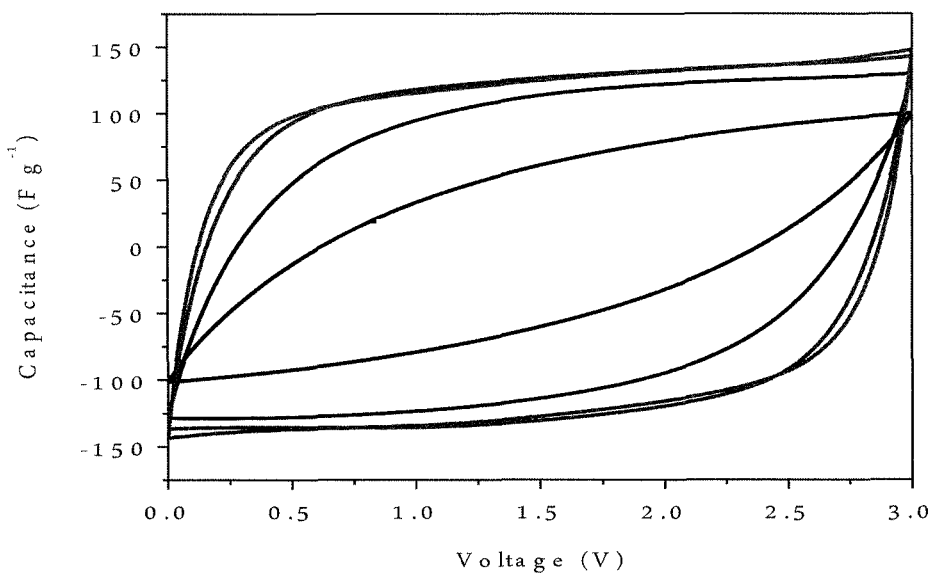
FIG. 6B is a graph showing CV curves of CNS-800 tested at different temperatures using a scan rate of 500 mV s$^{-1}$. The tested temperatures are, from the innermost to outermost curve: 0, 20, 60 and 100° C.
Figure 7A:
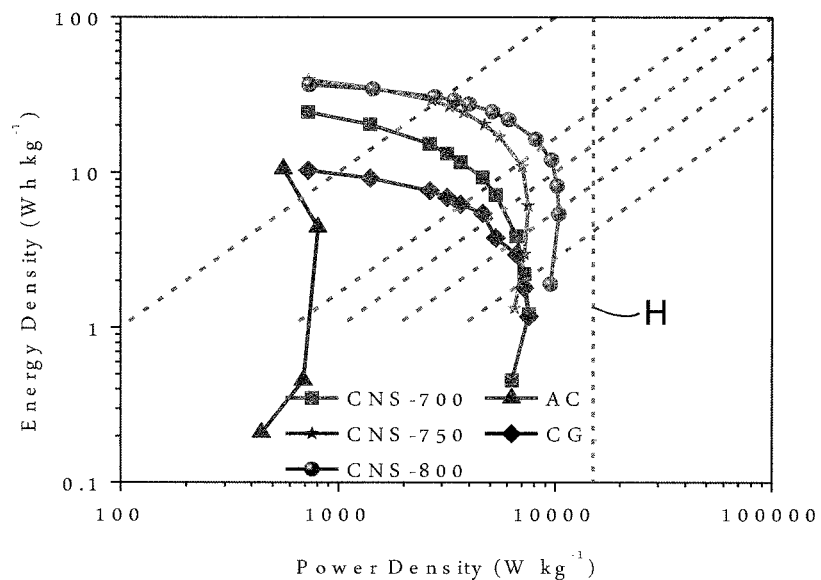
FIGS. 7A-D show Ragone Charts based on active materials comparing carbon nanosheets, commercial activated carbon and commercial graphene nanoplatelets. The slanted dotted lines represent, from left to right, 36 s, 6 s, 3.6 s, 2 s and 1 s.
Figure 7B:
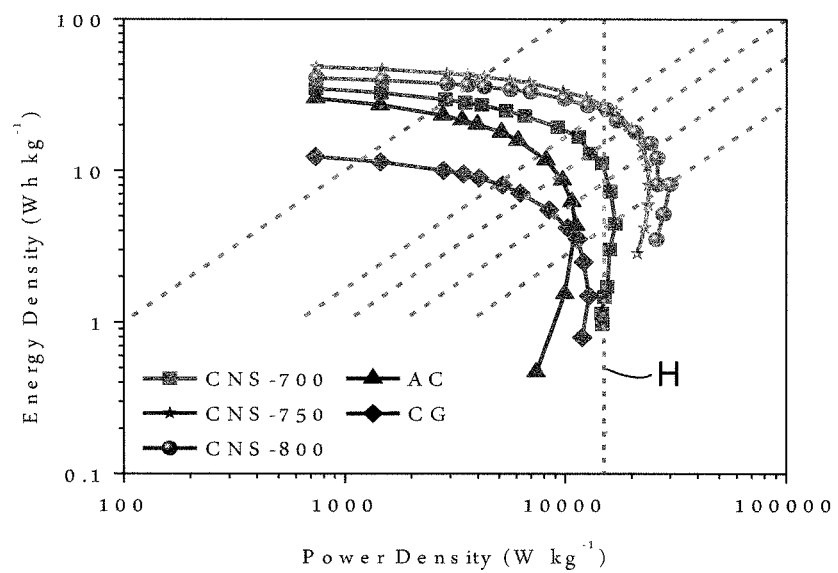
Figure 7C:
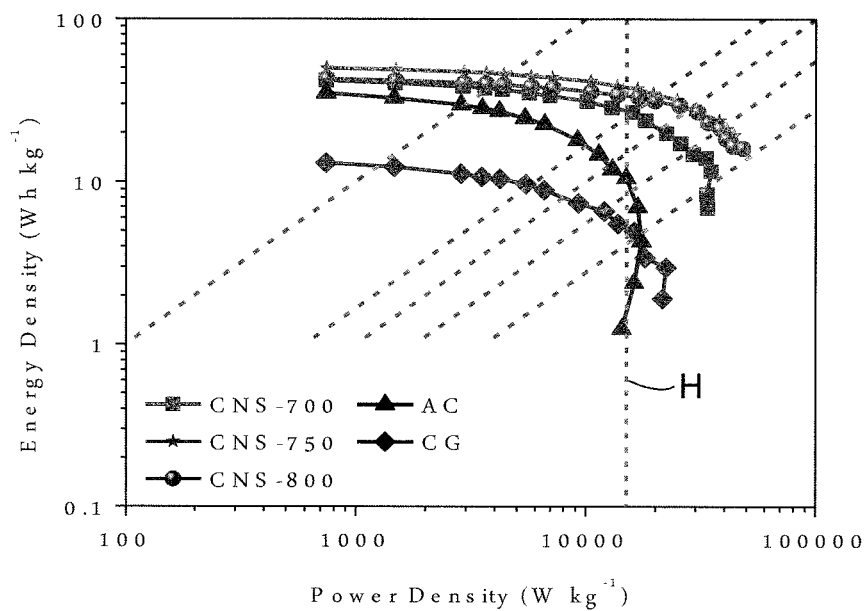
Figure 7D:
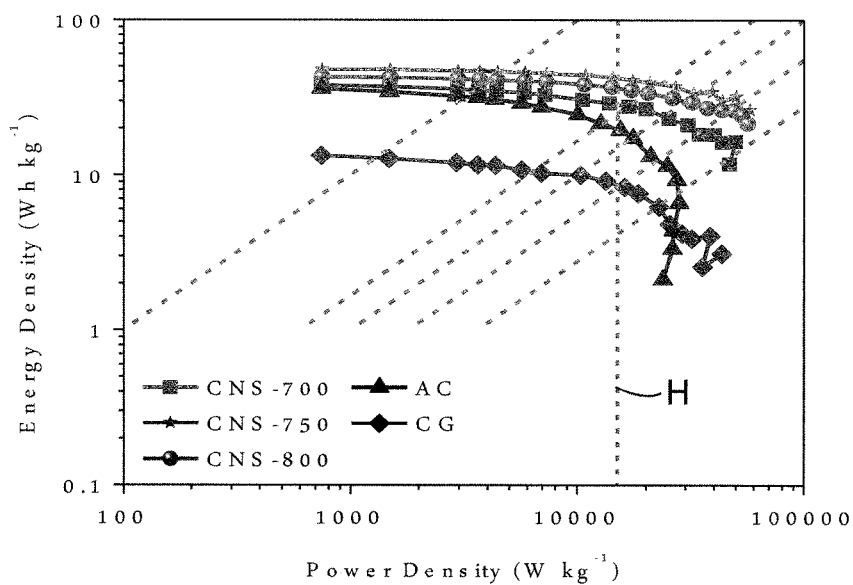
Figure 8A:
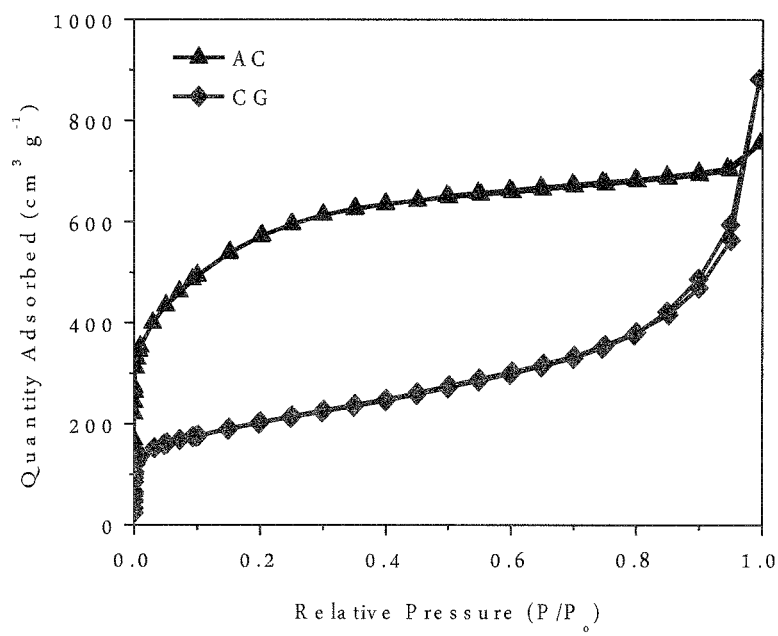
FIG. 8A shows nitrogen adsorption-desorption isotherms of commercial activated carbon (AC), commercial graphene nanoplatelets (CG).
Figure 8B:
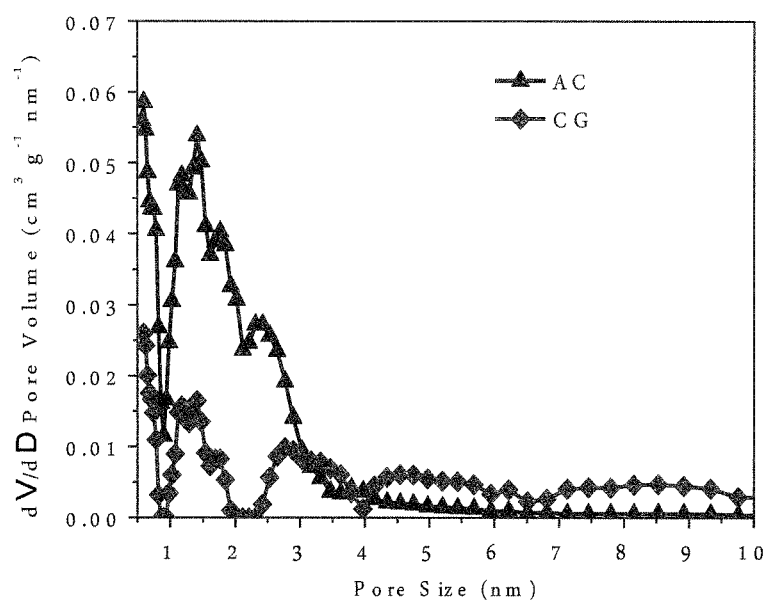
FIG. 8B shows pore size distributions calculated from nitrogen adsorption isotherms using the DFT method.
Figure 8C:
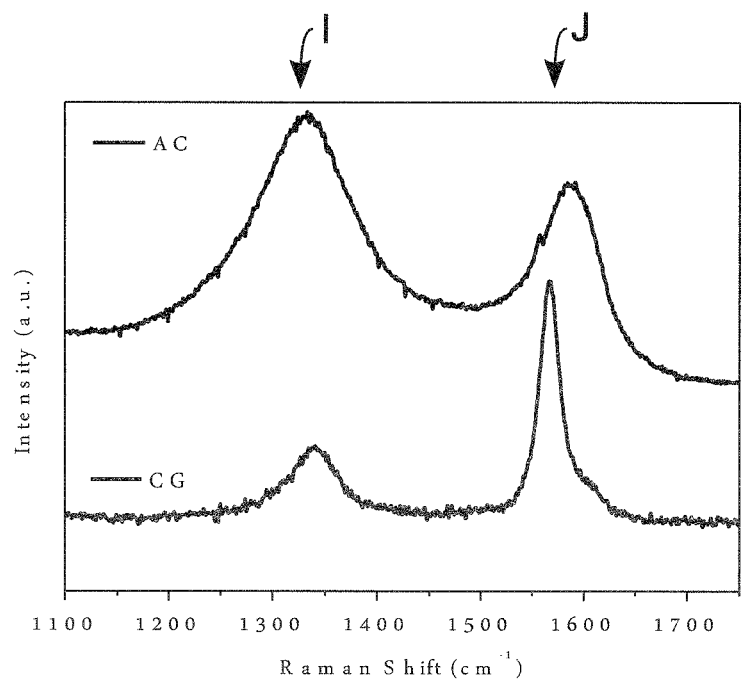
FIG. 8C shows raman spectra of baseline AC and CG.
Figure 8D:
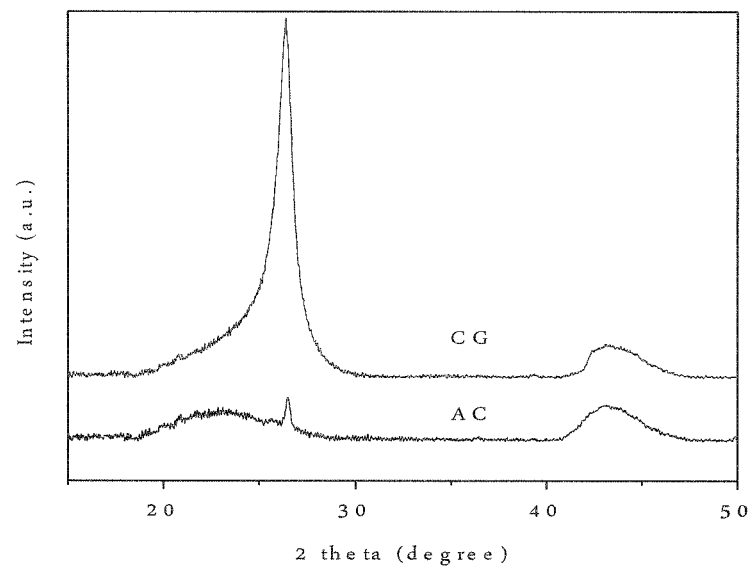
FIG. 8D shows XRD patterns of AC and CG.

The partially graphitic and interconnected structure of the hemp-derived carbon nanosheets with developed hierarchical porosity is expected to yield exceptional electrochemical capacitive properties in an ionic liquid electrolyte (1-butyl-1-methylpyrrolidinium bis(trifluoromethylsulfony)imide (BMPY TFSI, >99%, Ionic Liquids Technologies Inc. USA)). Cyclic voltammetry (CV) was utilized to evaluate the electrochemical performance of the CNS electrodes. Commercial activated carbon and commercial graphene nanoplatelets were also electrochemically tested as baselines (The SEM, Raman, XPS, XRD and porosity analysis of baseline commercial AC and CG are displayed in Table 1, above, and in FIGS. 8A-D. FIG. 8C shows D-band (I) and G-band (J) of baseline AC and CG). FIG. 3A shows the CV data for CNS-800 tested at 20° C. Even at a high scan rate of 500 mV s$^{-1}$, the curve still maintains a quasi-rectangular shape, demonstrating excellent ion transport behavior even in a viscous ionic liquid. FIG. 6A compares the CV curves of CNS-700, CNS-750, CNS-800, commercial activated carbon and commercial graphene nanoplatelets, all measured at 20° C. and 500 mV s$^{-1}$. The CNS samples (especially CNS-800) display significantly less distorted CV curves. The lack of distortion of the CNS CV curves compares quite favorably to published CV's of some state-of-the-art predominantly microporous carbons in ionic liquid electrolytes, tested at significantly lower rates (such as 100 mV s$^{-1}$) and at higher temperatures (such as 60° C.). CV curves were also generated for CNS-800 tested at 0, 20, 60 and 100° C., using the high scan rate of 500 mV s$^{-1}$, shown in FIG. 6B. While the 0° C. CV curve is distorted due to the ion transport losses, the fact that any capacitance can be achieved at 0° C. and 500 mV s$^{-1}$ is noteworthy (melting point of BMPY TFSI is −18° C.). CV curves of CNS-800 at scan rates from 100 to 500 mV s$^{-1}$, tested at 0° C. were created and demonstrate that at intermediate scan rates, such as 100 mV s$^{-1}$, a good capacitive response can be achieved even at such a low temperature. Overall, such superior high rate-low temperature performance is comparable to some of the best performing graphene-based electrode materials, and has not been achieved via bio-derived activated carbons. CV curves were also generated for CNS-800 tested at 60 and 100° C., using scan rates of 100 mV s$^{-1}$, 200 mV s$^{-1}$, 500 mV s$^{-1}$ and 1 V s$^{-1}$. The ionic liquid displays higher ionic conductivity and lower viscosity at or above 60° C., resulting in enhanced electric double-layer capacitance and decreased resistance for ion transport.

Figure 3B:
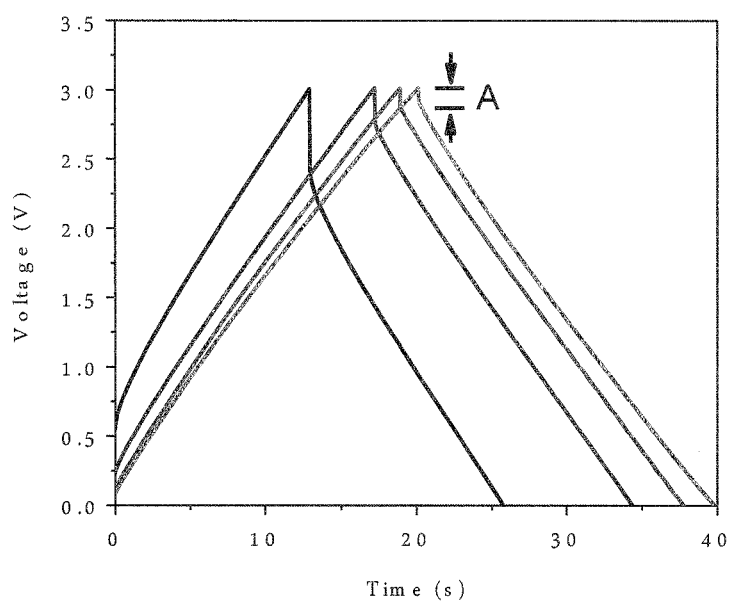
FIG. 3B is a graph showing galvanostatic charge-discharge profiles of CNS-800, at a current density of 10 A g$^{-1}$ tested at different temperatures. The profiles from left to right were tested at the temperatures 0, 20, 60 and 100° C.

Galvanostatic charge-discharge profiles were plotted on voltage versus time graphs for the CNS samples, commercial activated carbon and commercial graphene nanoplatelets at current densities of (a) 1, (b) 10 and (c) 20 A g-1, tested at 20° C. The profiles as distributed from left to right (shortest to longest charge-discharge times) were commercial graphene nanoplatelets, commercial activated carbon, CNS-700, CNS-750 and CNS-800. The galvanostatic charge-discharge profiles of CNS-800 tested at 0-100° C. are shown in FIG. 3B. The curves are highly linear and symmetrical, meaning that the CNS electrodes have excellent electrochemical reversibility and coulombic efficiency. For CNS-800, at a current density of 10 A g$^{-1}$, the IR drop, shown as distance A in FIG. 3B, is 0.08 V at 100° C., 0.12 V at 60° C., 0.23 V at 20, and 0.57 V at 0° C. While for all samples the IR drop increases with decreasing testing temperature, it does so the least for the CNS-800. For example, at a scan rate of 10 A g$^{-1}$ and tested at 20° C., CNS-800 shows the smallest IR drop (0.23), followed by CNS-750 (0.25), CNS-700 (0.39), GC (0.51) and finally AC (0.56). It is generally accepted that the IR drop is related with the electrical conductivity and porous texture (including the tortuosity, connectivity, size distribution, and shape of pores) of electrode. Specimen AC has the largest IR drop due to a combination the lowest electrode conductivity and the least optimum porous structure. The variation of the electrical conductivity and domain size between samples CNS-700, CNS-750 and CNS-800 is not significant, and we believe that CNS-700 with relative higher IR drop can be attributed to its lower percentage of volume of mesopores (40.4%) than that of CNS-750 (43.8%) and CNS-800 (58.2%). The BNPY TFSI electrolyte is high viscosous and contains ions of large diameters (the maximum dimension of the cation and the anion are 1.1 and 0.79 nm, respectively.). The lack of smooth inner-pore transport pathway will inevitably result in a significant ionic diffusional loss contribution to the IR drop. The lower graphitic character and the additional interfacial contact resistance associated with packing of isolated micron-scale AC particles may result in higher resistance than the interconnected sheets of CNS. This is supported by a Nyquist plot comparing CNS-700, CNS-750, CNS-800, commercial activated carbon and commercial graphene nanoplatelets measured at 20° C. that demonstrates that the equivalent series resistances of the CNS samples are all on-par (~6Ω), while that of the AC is substantially higher (~30Ω).

Electrochemical impedance spectroscopy further confirms the favorable performance of the carbon nanosheets. Nyquist plots of CNS-800, measured at 0, 20, 60 and 100° C. The real axis intercept represents the equivalent series resistance, which is a combination of ionic resistance of the electrolyte, electrical resistance of the electrode, and contact resistance at the active material/current collector interface. The increase in the equivalent series resistance with decreasing temperature may largely be attributed to the changes in the ionic resistance of the electrolyte, since the electrical resistance of the electrode and the contact resistance would not vary substantially over the 100° C. window. The projected length of the Warburg-type line (the 45° segment) is related to the ion diffusion limitations within the electrode material. The diffusion of electrolyte ions stopped at about 0.5, 2, 6.3 and 15.8 Hz at 0, 20, 60 and 100° C., respectively, showing improved frequency response with increased testing temperature. Such frequency response is comparable to recently reported activated graphene. Bode plots of the frequency response of capacitance of CNS-800 were measured at 0, 20, 60 and 100° C. The operating frequency at which the capacitance is 50% of its maximum value increased from 0.075 (0° C.) to 0.22 (20° C.), 0.39 (60° C.) and 0.62 Hz (100° C.). These values of operating frequency are quite high for supercapacitors employing ionic liquid electrolytes. They are comparable to what was obtained for state-of-the-art ordered mesoporous carbide derived carbons (0.1-0.7 Hz in an ionic liquid), and higher than what was previously reported for optimized activated hydrothermal carbons (0.1 Hz in organic electrolyte) and advanced polypyrrole-derived activated carbons (~0.06 Hz in ionic liquid electrolyte at 60° C.).

Figure 4:
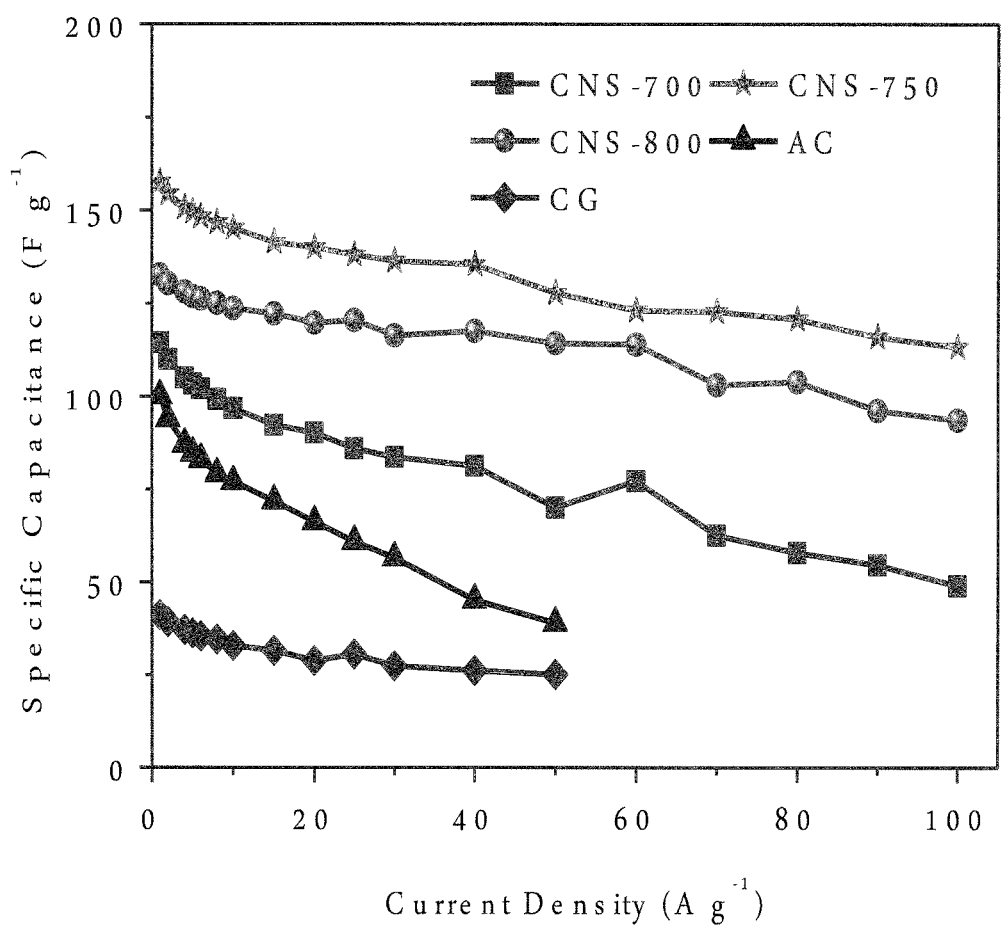
FIG. 4 is a graph of specific capacitance versus current density, tested at 20° C., for the carbon nanosheets, baseline commercial activated carbon (AC) and baseline graphene nanoplatelets (CC).

FIG. 4 shows the specific capacitance versus current density, tested at 0-100° C., for the carbon nanosheets, baseline commercial activated carbon and baseline graphene nanoplatelets. At 20-100° C., CNS-750 exhibits the largest capacitance due to its overall highest accessible surface area. At 0° C., CNS-800 has better performance at scan rates higher than 5 A g$^{-1}$, while CNS-750 is superior at the lower scan rates. The performance transition from CNS-750 to CNS-800 at 0° C. is mainly attributed to the role of the pore size and shape in determining the ion adsorption characteristics. At 0° C. and higher currents, the micropores could give rise to higher Ohmic resistance due to the ion "traffic jam," leading to the decrease of capacitance from micropores. In this case, the net capacitance is in part dictated by the surface area associated with mesoporosity. Interestingly, we noted that the better performed sample (CNS-800) has lower specific surface area from mesopores (280 m$^2$ g$^{-1}$) than CNS-750 (325 m$^2$ g$^{-1}$). This seemingly contradictory result might be contributed to the pore/surface curvature of two samples. It is intuitive that highly curved and tortuous inner pore surfaces would lead to more diffusional losses and less effective ion adsorption as compared to more planar ones. Although it is difficult to determine the exact pore shape of these samples, we noted that the average mesopore size of CNS-800 (4.3 nm) is larger than that of CNS-750 (3.4 nm) judging from the pore size distributions (calculated from adsorption isotherms using DFT method). It has been recently demonstrated that the surface area normalized capacitance increased with increasing pore size in the 2 to 5 nm pore range, and therefore CNS-800 should have higher surface area normalized capacitance from mesopores. In general, CNS-800's mesoporosity combined with the short diffusion distances normal to the nanosheet thickness allows for facile ion transport and provides high capacitance at low temperature and high rates.

At 20° C. and 100 A g$^{-1}$, CNS-750 and CNS-800 retain more than 70% of their capacitance at 1 A g$^{-1}$. This amazing capacitance retention is ascribed to the high mesopore volume and nanoscale diffusion pathway that allows for rapid ion transport. The capacity retention ratio for carbon nanosheets at 100 A g$^{-1}$ is as high as 72-92% when measured at 60 and 100° C. Even tested at 0° C., the capacitance of CNS-800 can reach 122 F g$^{-1}$ at 1 A g$^{-1}$ with 66% of the capacitance being still delivered at 30 A g$^{-1}$. At 20° C. and 1 A g$^{-1}$ the surface area normalized capacitance for CNS-700, CNS-750 and CNS-800 was 6.8, 6.9, and 8.8 µF cm$^{-2}$ (based on BET surface area) and 8.5, 9.3, and 11.4 µF cm$^{-2}$ (based on DFT surface area). These values are much higher than those of commercial activated carbon (4.9/6.4 µF cm$^{-2}$, BET/DFT) and graphene nanoplatelets (5.7/6.5 µF cm$^{-2}$ BET/DFT). Overall, CNS-800 achieved the highest surface area normalized capacitance, which is higher than recently reported activated graphene (6.9 µF cm$^{-2}$) and close to polypyrrole-derived activated carbon and carbide derived carbons (7-14 µF cm$^{-2}$).

Figure 5:
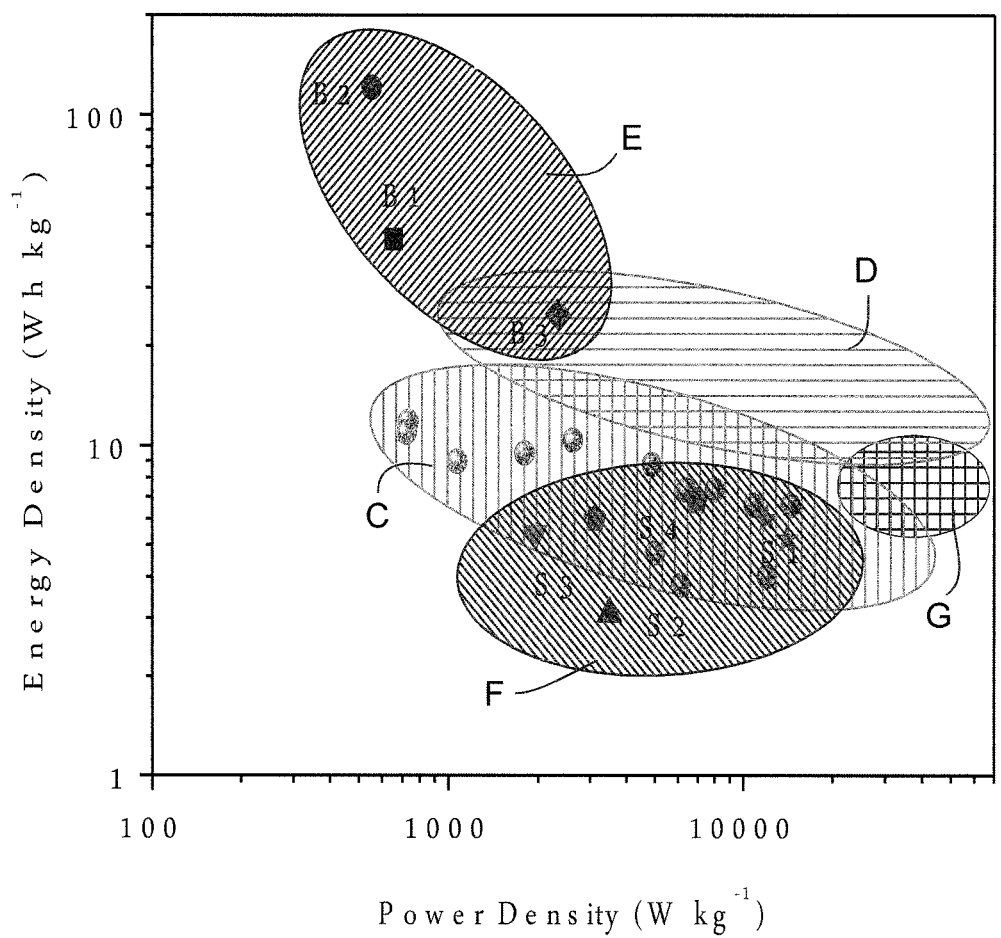
FIG. 5 is a performance comparison of CNS-based device measured at 20-100° C. for commercial batteries and supercapacitors (B1: Panasonic NiHD, B2: Sanyo Li-ion, B3: Bolder Pd-acid; S1: Maxwell BCAP3000 and BCAP0310, S2; Panasonic 800F, S3: Superfarad 250 F, S4: Salt Gen2 and Gen3.). The values for commercial batteries and supercapacitors are the maximum energy and power densities.

The energy density and power density of CNS-800 were evaluated at different testing temperatures and plotted in Ragone plots, with the specific energy and power being based on the Mass of the active materials in a two-electrode configuration and on the total device mass. The energy and power density were normalized to the total mass of the device and the mass of the active material. FIGS. 7A-D show similar active mass normalized Ragone plots comparing CNS-700, CNS-750, CNS-800, commercial activated carbon and graphene nanoplatelets, evaluated at 0-100° C. Line H represents the PNGV power target. When tested at 20° C., CNS-750 and CNS-800 exhibit high energy density of about 19 and 18 Wh kg$^{-1}$ at a power of 20 kW kg$^{-1}$. This energy density is increased to 34/31 and 40/34 Wh kg$^{-1}$ at 60 and 100° C., respectively. Even testing at room temperature, CNS samples can still exceed the PNGV power target (15 kW kg$^{-1}$, in terms of electrode active material) with high energy density. In the temperature range of 0-100° C., CNS samples have much better energy-power characteristics than AC and CG. The exceptional energy characteristic of the CNS specimens is fully expected given their high specific capacitance at most scan rates/temperatures (See methods section for detailed calculations). We also compare the energy density and power density of the CNS electrode to those of other reported activated carbon, mesoporous carbon, carbon nanotube and graphene electrodes based on electrode active mass. Comparatively the CNS electrodes exhibit comparable or even higher energy densities and substantially higher power densities. When considering all the components of the packaged cell, the carbon weight accounts for about 30% of the total mass of the packaged device. A factor of 4 was used to extrapolate the energy-power density of the cell from the performance based on active material. FIG. 5 compares the performance of CNS-based devices in the present work (C) and future work (D) with commercial batteries (E) and supercapacitors (F). Maximum power is shown as area G. The values for commercial batteries and supercapacitors are the maximum energy and power densities reported. The estimated maximum energy density of our device obtained at an operating voltage of 3.0 V is ~12 Wh kg$^{-1}$, which is higher than that of commercially available supercapacitors. An energy density of 8-10 Wh kg$^{-1}$ can be achieved for CNS-based device and the device can be completely recharged in less than 6 s. Based on the cell internal resistance values determined from the IR loss values, the maximum power density of CNS-800 tested at 20° C. is 28 kW kg$^{-1}$ based on total device, and this value increased to 49 kW kg$^{-1}$ at 60° C. and 77 kW kg$^{-1}$ at 100° C., which is about 10-100 times higher than commercial batteries. From FIG. 5, we may argue that an ionic liquid with a wider electrochemical window (such as ~4V) can be employed, and the CNS-based devices may actually bridge the energy gap between commercial batteries and supercapacitors.

Electrochemical cycling stability of CNS-800 was tested at 10 A g$^{-1}$. The specific capacitance decreases slightly (8%) after the initial 1000 cycles. However, then the capacitance increases and remains at 96% of the initial capacitance even after 10,000 cycles. The cycling induced improvement observed after 1000 cycles may be attributed to improved pore wetting by the IL electrolyte or perhaps to in situ activation of the electrode to expose additional surface area.

To summarize, the unparalleled high rate capability, low temperature performance, high frequency response and long cycle life of our obtained carbon nanosheet materials can be ascribed to several microstructural (pore structure and carbon structure) factors: The carbons are highly interconnected and partially graphitic, yielding excellent electrically conductive electrode. The macroporous voids with diameters of 1-2 µm serve as ion-buffering reservoirs. The low thickness of the carbon nanosheets (10-30 nm) ensures nano-scale distances (5-15 nm) for ion diffusion. The high total content of mesopores facilitates the accessibility of the electrolyte ions to the electrode surface and allows for fast ion transport.

Here we report the successful hydrothermal-based synthesis of two-dimensional, yet interconnected, carbon nanosheets with superior electrochemical storage properties comparable to state-of-the-art graphene based electrodes. We were able to achieve this by employing a biomass precursor with a unique structure-hemp bast fiber. The resultant graphene-like nanosheets possess fundamentally different properties (pore size distribution, physical interconnectedness, and electrical conductivity) as compared to conventional biomass-derived activated carbons. The electrodes fabricated from our materials work down to 0° C., and display some of the best power-energy combinations reported in literature for any carbon. For example, at a very high power density of 20 kW kg$^{-1}$ and 20, 60 and 100° C., the energy densities are 19, 34 and 40 Wh kg$^{-1}$, respectively. When the entire device is considered, an energy density of 8-10 Wh kg$^{-1}$ can be achieved at a charge time less than 6 s.

Material Preparation. Carbon nanosheets were prepared by carbonization and activation of the hydrothermal product of hemp bast fiber (volatile content, 81.98 wt %; ash content, 2.95 wt %). Detailed procedures are described as follows: 3.0 g of hemp bast fiber and 50 mL diluted sulfuric acid were placed in a 120 mL stainless steel autoclave. The autoclave was sealed and heated at 180° C. for 24 h, then allowed to cool to room temperature. The resulting carbonaceous solid, denoted as biochar, was recovered by filtration, washed with distilled water and dried. The biochar material was chemically activated using potassium hydroxide. The biochar and KOH were thoroughly ground in an agate mortar in a 1:1 mass ratio, and then the mixture was heated at 700-800° C. (3° C. min$^{-1}$) for 1 h under argon flow. After that, the activated samples were thoroughly washed with 10 wt % HCl and distilled water. Finally, the carbons were dried in an oven at 100° C. for 12 h.

Material Characterization. SEM was conducted with a Hitachi-4800 scanning electron microscope. TEM was performed using the JEOL 2010 microscope at 200 kV. XRD analysis was performed using a Bruker AXS D8 Discover diffractometer with a Cu Kα radiation source. XPS is obtained on an Axis Ultra spectrometer. Raman spectroscopy analysis was performed with a confocal microprobe Raman system (Thermo Nicolet Almega XR Raman Microscope). Nitrogen adsorption-desorption analysis was performed using Quantachrome Instruments (U.S.A) Autosorb-1 at −196° C. The conductivity is measured by Pro4 from Lucas Labs.

Electrochemical Measurement. A slurry of 80 wt % carbon material, 10 wt % carbon black and 10 wt % poly (vinylidenedifluoride) in N-methyl pyrrolidone was coated onto a stainless steel disc (~2 mg cm$^{-2}$, 50-100 µm thick) and then dried at 100° C. overnight in vacuum oven. 2032 stainless-steel coin cells with two symmetrical carbon electrodes separated by a porous polymetric separator were assembled inside an Ar-filled glove box (<0.1 ppm of both oxygen and $H_2O$), Cyclic voltammetry (CV) curves, galvanostatic charge-discharge profiles, and electrochemical impedance spectroscopy measurements were measured using a Solartron 1470E Multichannel Potentiostat/Cell Test System. The gravimetric capacitance for single electrode, $C_g$ (F $g^{-1}$), was calculated based on charge-discharge profiles according to $$C_g = \frac{2I}{(dV/dt)m}$$

where I is the current (A), dV/dt is the slope of the discharge curve after the ohmic drop (V $s^{-1}$), and m is the mass (g) of active material in each electrode. The energy density (E, Wh $kg^{-1}$), power density (P, W $kg^{-1}$) (on an active mass normalized biasis) were calculated according to $$E = \frac{1}{2}C_g V^2 \times \frac{1}{4} \times \frac{1}{3.6}$$
$$P = \frac{E}{t}$$

where V is the cell voltage after ohmic drop (V), t is the discharge time (h). The maximum power density ($P_{max}$, kW $kg^{-1}$) was calculated based on the internal resistance ($R_s$) of the cell, which can be obtained by fitting the relationship between IR drop and current density. Linear fit model for IR drop: $IR_{drop}=a+bI$, where a represents the difference between the 3V applied and the charged potential of the supercapacitor, b represents double the value of $R_s$, and I is the discharge current, $$P_{max} = \frac{V_{OCV}^2}{4R_s} = \frac{(3-a)^2}{2b}$$

We created unique interconnected partially graphitic carbon nanosheets (10-30 nm in thickness) with high specific surface area (up to 2287 $m^2$ $g^{-1}$), significant volume fraction of mesoporosity (up to 58%), and good electrical conductivity (211-226 S/m) from hemp bast fiber. The nanosheets are ideally suited for low (down to 0° C.) through high (100° C.) temperature ionic liquid-based supercapacitor applications: At 0° C. and a current density of 10 A $g^{-1}$, the electrode maintains a remarkable capacitance of 106 F $g^{-1}$. At 20, 60, and 100° C. and an extreme current density of 100 A $g^{-1}$, there is excellent capacitance retention (72-92%) with the specific capacitances being 113, 144 and 142 F $g^{-1}$, respectively. These characteristics favorably place the materials on a Ragone Chart providing among the best power—energy characteristics (on an active mass normalized basis) ever reported for an electrochemical capacitor: At a very high power density of 20 kW $kg^{-1}$ and 20, 60 and 100° C., the energy densities are 19, 34 and 40 Wh $kg^{-1}$, respectively. Moreover, the assembled supercapacitor device yields a maximum energy density of 12 Wh $kg^{-1}$, which is higher than commercially available supercapacitors. By taking advantage of the complex multi-layered structure of a hemp bast fiber precursor, such exquisite carbons were able to be achieved by simple hydrothermal carbonization combined with activation. This novel precursor-synthesis route presents a great potential for facile large-scale production of high-performance carbons for a variety of diverse applications including energy storage.

See U.S. Provisional Application No. 61/819,393, filed May 3, 2013, or published papers Wang, H., et al., Interconnected Carbon Nanosheets Derived from Hemp for Ultrafast Supercapacitors with High Energy, *ACS Nano* 2013 7 (6), 5131-5141, for citations.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A method of forming a carbon nanosheet, the method comprising exfoliating crystalline cellulose followed by carbonizing the crystalline cellulose to create carbonized crystalline cellulose, wherein the crystalline cellulose comprises crystalline cellulose hemp fibrils.

2. The method of claim 1, wherein the carbonizing comprises a partial carbonization step followed by activating the carbonized crystalline cellulose.

3. The method of claim 2, wherein activating comprises alkali activating.

4. The method of claim 1, wherein exfoliating and carbonizing comprises a hydrothermal treatment.

5. The method of claim 4, wherein the hydrothermal treatment employs a catalyst selected from a group consisting of sulphuric acid, iron oxide, and chloride.

6. The method of claim 1, wherein the carbon nanosheet is between 10 and 30 nanometers thick.

7. The method of claim 1, wherein the carbon nanosheet is at least partly graphitized.

8. A method of forming a graphene-like carbon nanosheet, comprising the steps of:
partially carbonizing crystalline cellulose hemp fibrils by a hydrothermal treatment; and
activating the partially carbonized crystalline cellulose hemp fibrils.

9. The method of claim 8, wherein the step of activating the partially carbonized crystalline cellulose hemp fibrils includes alkali activating.

10. The method of claim 8, wherein the step of activating the partially carbonized crystalline cellulose hemp fibrils includes heating to at least 700° C.

11. The method of claim 8, further comprising exfoliating the crystalline cellulose hemp fibrils prior to the step of partially carbonizing the crystalline cellulose hemp fibrils.

12. The method of claim 8, wherein the graphene-like carbon nanosheet includes macroporous voids of 1-2 μm in diameter.

13. The method of claim 12, wherein the graphene-like carbon nanosheet includes mesopores of 2-5 nm in diameter.

14. The method of claim 8, wherein the graphene-like carbon nanosheet is between 10 and 30 nanometers thick.

15. The method of claim 14, wherein the step of activating the partially carbonized crystalline cellulose hemp fibrils includes heating to at least 800° C.

16. The method according to claim 8, wherein the graphene-like carbon nanosheet is at least partly graphitized.

17. The method according to claim 8, wherein the hydrothermal treatment includes hydrolysis, dehydration, decomposition, and condensation.

18. The method according to claim 8, wherein the hydrothermal treatment employs a catalyst selected from a group consisting of sulphuric acid, iron oxide, and chloride.

* * * * *